United States Patent [19]

Winther

[11] 4,144,920
[45] Mar. 20, 1979

[54] TIRE CHAIN CONSTRUCTION

[76] Inventor: Earl C. Winther, 828 Indian Hills Dr., Moscow, Id. 83843

[21] Appl. No.: 829,801

[22] Filed: Sep. 1, 1977

[51] Int. Cl.$^2$ ................................................ B60C 27/02
[52] U.S. Cl. ...................................... 152/233; 152/239
[58] Field of Search ................................ 152/231–233, 152/239, 241, 242, 208, 213 R, 213 A

[56] References Cited

U.S. PATENT DOCUMENTS

| | | | |
|---|---|---|---|
| 2,474,696 | 6/1949 | Schwab | 152/233 |
| 2,631,636 | 3/1953 | Chancellor | 152/233 |
| 2,711,770 | 6/1955 | Conoscente et al. | 152/233 |
| 2,918,960 | 12/1959 | McGuinness | 152/233 |
| 2,996,094 | 8/1961 | McGuinness | 152/233 |
| 3,513,897 | 5/1970 | Morris | 152/233 |
| 3,918,504 | 11/1975 | Prokesch | 152/233 |

*Primary Examiner*—Robert G. Sheridan
*Assistant Examiner*—D. W. Underwood

[57] ABSTRACT

A traction increasing chain for vehicular tires that may be installed thereon without moving the tire relative to the surface supporting it. The chain provides plural rigid side elements articulately interconnected and carrying cross-chains, all so configured that when installed on a tire the cross-chains will cover a portion, but not the supported portion, of the peripheral surface of the tire. A medial fastening linkage maintains the chain on the tire during usage.

1 Claim, 5 Drawing Figures

TIRE CHAIN CONSTRUCTION

BACKGROUND OF INVENTION

Related Applications

There are no applications related hereto now filed in this or any foreign country.

1. Field of Invention

My invention relates generally to an annular chain type non-skid device for resilient vehicular tires and more particularly to such a device that may be installed without moving the tire relative to its supporting surface.

2. Description of Prior Art

Annular chain type devices of various sorts that provide cross-links extending across the outer peripheral surface of a resilient pneumatic tire have been long known and used to increase the frictional engagement of such tires and prevent their skidding on slick or poorly supportative surfaces. Commonly such devices have extended uniformly about the periphery of an associated tire and have been installed thereon by moving the tire either vertically or horizontally relative to the surface supporting it during the installation process. This type of chain installation is laborious, difficult and cumbersome. Responsively to the problem various chain type traction devices have heretofore been developed that may be operatively positioned without moving the vehicle relative to the surface supporting it. The instant invention provides a new and novel member of this class of device.

In providing such a device several problems arising from its essential nature must be resolved and since each problem interrelates with the others, the solution should maximize the total benefit. Since this type of traction device depends for its operation upon cross-links extending across the outer peripheral surface of a tire, obviously, if it is to be installed without moving the tire relative to its supporting surface, the cross-links may not extend across that portion of the tire being supported; and necessarily then, the device may extend over only a part of the periphery of the tire. Since the tire is resiliently deformed, a substantial portion of its peripheral surface is supported in direct adjacency with a supporting surface. Again, the particular tire in its operation rotates at relatively high rotational velocity, the device to be effective must be reasonably dynamically symmetrical to prevent undue wear on the traction device and its supporting mechanism. In addition, if the device is to be useful, it must be easily installable in the first instance and thereafter maintainable on deformable tire during normal operation.

Various of the prior art devices have resolved at least one of these problems to some degree of effectiveness, but the instant invention differs from that prior art by solving all of these problems and yet maintaining a maximum of utility and effectiveness. In so doing I provide an annular chain type device that extends over diametrically opposed segments of a tire in a statically or geometrically symmetrical fashion to provide a minimal amount of dynamic dissymmetry. My invention leaves substantial diametrically opposed portions of the peripheral surface of a tire uncovered to provide for simple, easy installation of the device. It further provides articulated, rigid inner rims to support the chain cross-links, the inner rims being joined in part by a rigid interconnecting linkage, all to provide a device easier to install in the inception and one that is maintained upon the resiliently flexible tire during operation much more readily than a structure formed completely of chain and especially one with chain forming its sides. I also provide a particular fastening device that increases the dynamic stability of the chain and provides a sure, but yet simple and effective means of releasably fastening the chain about a supporting tire. My invention resides not in any single one of the features recited but rather in the combination of all and it differs from the prior art in this regard.

SUMMARY OF INVENTION

My invention provides a generally an elongate chain type traction device that fits about the outer peripheral surface of a resilient vehicle tire and may be installed on the tire by releasably fastening its adjacent ends thereabout without moving the tire relative to its supporting surface.

An elongate chain structure is provided having opposed cooperating side elements interconnected by plural chain cross-links extending therebetween in spaced array. Each side element is formed partially of rigid members and partially of flexible members with releasbly interconnecting linkage at the opposed ends. The chain structure is sized in traditional fashion to fit with its side elements on each side of a tire, radially inwardly from the periphery and with the chain cross-links extending from one side element to the other across the outer periphery of the particular tire to be serviced. The chain cross-links are so spaced as to leave two diametrically opposed sections of the serviced tire that are not covered thereby when the chain is in place thereon. A fastening structure provides adjustably tightenable linkage extending between diametrically opposed portions of the outer side element of the chain.

In creating such a device it is:

A principal object of my invention to provide a chain type traction device for use upon resilient pneumatic vehicular tires that may be easily installed thereon without moving the supporting tire relative to its supporting surface during the installation process.

A further object of my invention to create such a device that has static symmetry and reasonable dynamic symmetry to alleviate mechanical problems caused by the lack of symmetry in such devices.

A further object of my invention to provide such a device that is readily maintainable upon a tire in use during any ordinary operation.

A still further object of my invention to provide such a device that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be understood that its essential features are susceptible to change in design and structural arrangement with only one preferred and practical embodiment being illustrated as is required.

BRIEF DESCRIPTION OF DRAWINGS

In the accompanying drawings which form a part hereof and wherein like numbers of reference refer to similar parts throughout.

DESCRIPTION OF THE PREFERRED EMBODIMENT

My invention provides generally an elongate tire chain having opposed cooperating side elements 10 interconnected by spaced cross-links 11 and fastenable by tightening structure 12 upon tire 13 to serve as an auxiliary traction and anti-skid device.

Figure 1:
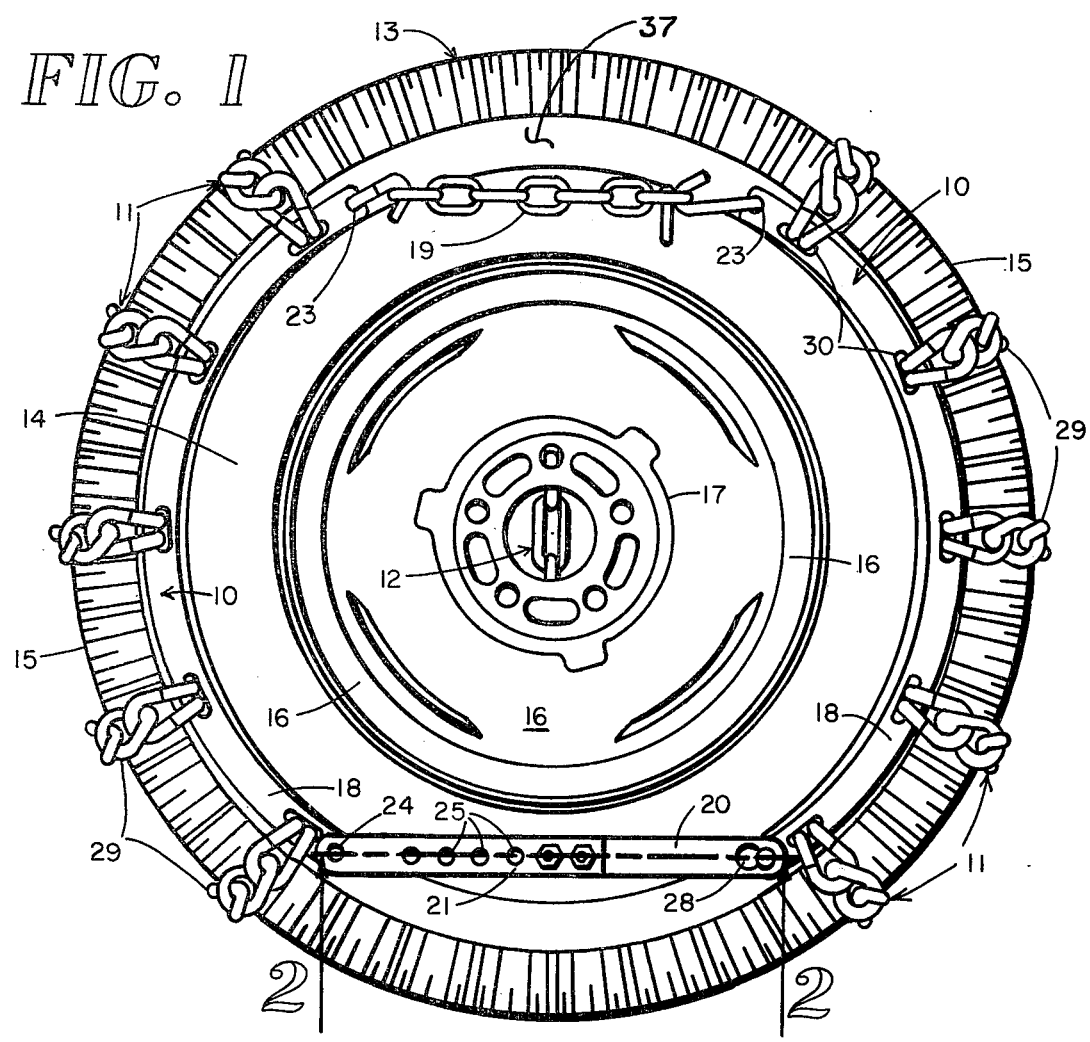
FIG. 1 is an orthographic side view of the back or inwardly facing side of my invention installed upon a pneumatic tire of commerce to show its various parts, their configuration and relationship from this aspect.
Figure 4:
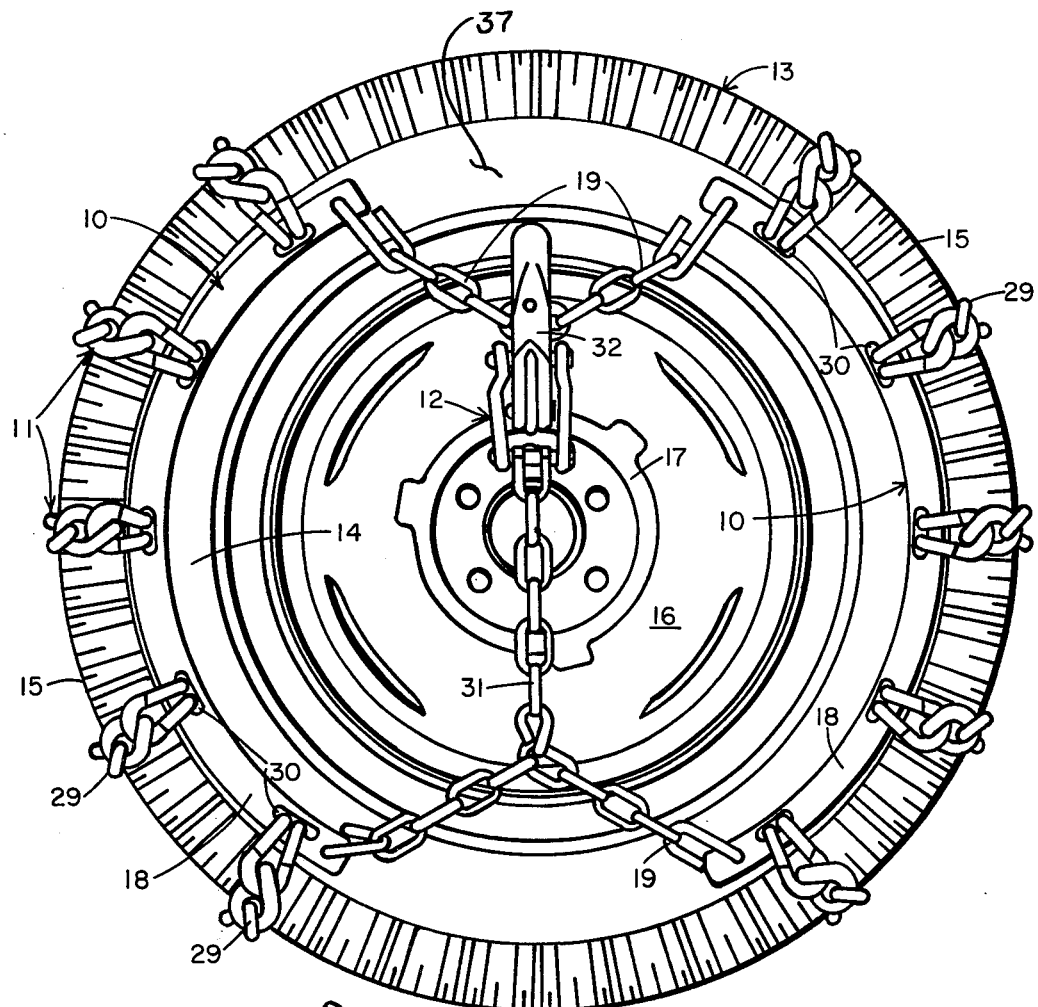
FIG. 4 is an orthographic side view of the outside of the tire chain illustrated in FIG. 1, again showing its various parts, their configuration and relationship from this aspect.

My invention is for use principally upon a resilient pneumatic vehicular tire 13 as illustrated particularly in FIGS. 1 and 4. This type of tire provides body 14, with outer-most peripheral supportative surface 15, carried by rigid wheel 16 supported by hub 17 on an appropriate axle of a serviced vehicle (not shown). The tire is substantially round in a relaxed condition, but when inflated and in actual use it is sufficiently resilient that it flattens in adjacency with a supporting surface to create some substantial area of contact between the tire and that supportative surface.

The various parts of my chain are bestly seen, understood and described with reference to its positioning upon a supporting tire, as illustrating particularly in FIGS. 1 and 4. The chain is different on each of its sides and for convenience "inside" will be used to distinguish the side of the chain and tire that faces toward the associated vehicle (FIG. 1) and "outside" will be used to distinguish that side of the chain and tire that faces away from the associated vehicle (FIG. 4).

Side elements 10 each comprises similar rigid, paired opposed arcuate elements 18 joined on the outside side and at the top of the inside side by interconnecting chains 19 and joined at the bottom of the inside side by rigid, elongate connecting bars 20, 21. Elements 18 are formed of rigid material to an arcuate configuration such that when the chain is positioned on a tire, as illustrated in FIGS. 1 and 4, these elements will be substantially concentric with the tire. Each of the elements 18 are provided with plural, spaced cross-link slots 22 to receive and interconnect the end parts of cross-links 11. The end part of each element 18 defines chain hold 23 to receive one of the end elements of interconnecting side chains 19. One or more of the interconnecting side chains may contain a releasable link that may be fastened to one of the rigid arcuate elements 18 to aid in the installation of the chain, but this is not necessary to allow chain installation and in some instances, particularly in the case of a novice, may actually hinder the installation.

Figure 2:
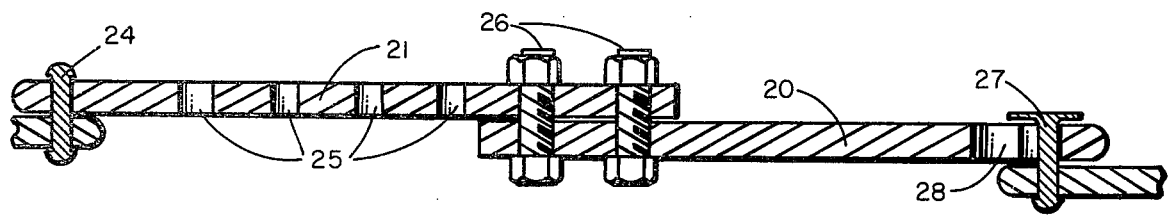
FIG. 2 is an enlarged, partial cross-sectional view of the rigid fastening linkage of the inner side of my chain, taken on the line 2—2 of FIG. 1 in the direction indicated by the arrow thereon.

The structure and interconnection of rigid connecting bars 20, 21 are illustrated bestly in FIG. 2, where it is seen that bar 21 is pivotably joined to the lower end portion of one inner arcuate element 18 by rivet 24 extending through appropriate cooperating holes in the adjacent end parts of the members. The opposite end portion of bar 20 is provided with spaced connecting holes 25 to allow adjustable interconnection with bar 21. Bar 21 has a structure similar to bar 20 with plural connecting holes 25 appropriately spaced to bring one or more of these holes in each member 20, 21 into coincidence, so that they may be releasably interconnected by bolt-nut combinations 26. The other end of connector bar 21 is releasably fastened to the end of the adjacent rigid arcuate element in a releasable fashion, preferably by means of headed pin 27 structurally carried in the end part of the arcuate element and projecting away therefrom a spaced distance to be releasably received in key type slot 28 defined in the end part of rigid connector bar 21. This linkage then provides a semi-rigid, yet releasable connection in the lower part of the inside of the chain structure between the lowermost portions of the opposed cooperating arcuate elements 18.

Figure 3:
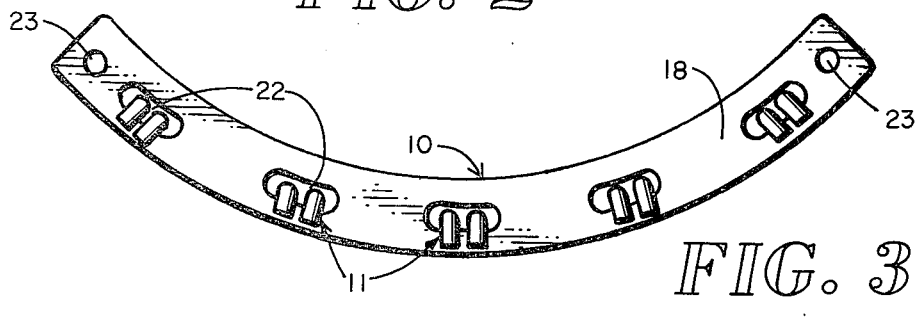
FIG. 3 is an orthographic view, looking from the position of a tire outwardly at the tire facing side, of one of the rigid portions of the side of my chain showing particularly the fastening of the cross-links thereto.

Chain cross-links 11 extend from structural communication with one rigid arcuate element 18 on the inner side of a tire to the opposed cooperating rigid arcuate element 18 on the outer side of the tire. Each chain cross-link comprises body portion 29, extending over the periphery of a tire to provide a traction element, communicating between fastening links 30 which pass through each of the paired opposed cooperating cross-link slots 22 in rigid arcuate elements 18 and flare on the opposite side of that element to create an articulating linkage between the rigid arcuate elements and the cross-links, all as illustrated particularly in FIGS. 1 and 3.

The spacing of cross-links 11 along side elements 10 is not critical but should be such as to give substantially the configuration illustrated in FIGS. 1 and 4. There should be substantial diametrically opposed gaps 37 which have no cross-links so that the device may be readily installed. Normally each of these gaps should subtend a central angle of approximately thirty degrees of tire periphery. It is desirable to have the gaps as small as possible, so long as consistent with installation, to create the greatest possible traction and non-skid surface. Again, the spacing of links relative to each other is not critical but should be uniform to promote dynamic stability. It generally should be at a distance that subtends a central angle of approximately ten degrees of the periphery for maximum operative benefit and greatest economy. The length of cross-links 11 is not critical within operative limits but it has been found in the traction chain arts generally that this length should be such as to allow side elements 10 to be three or four inches inside the periphery of the tire to provide greatest reliability in maintaining the chain in place during operation. The side elements should not extend too far radially inwardly on the tire, however, as this causes installation to be more difficult, accentuates tire wear and may cause damage to the tire sidewall.

Figure 5:
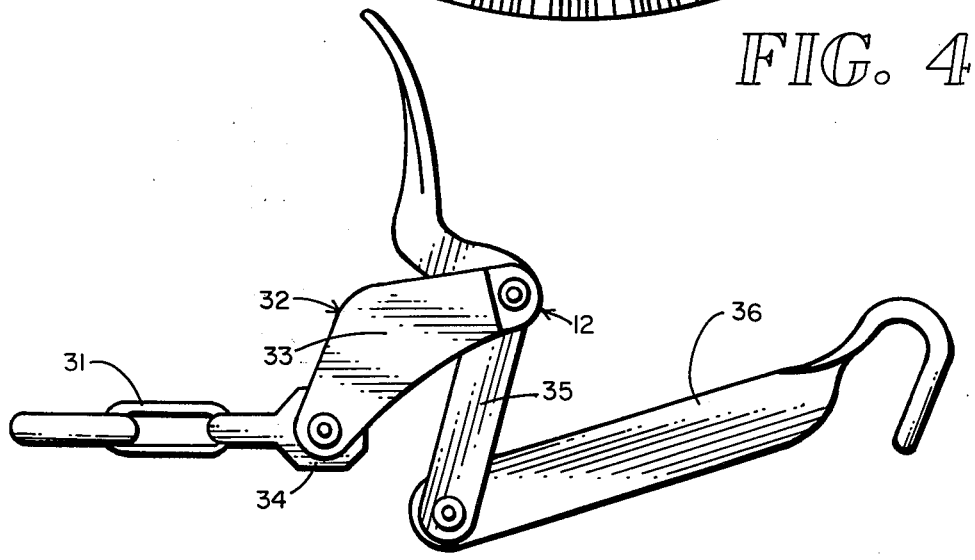
FIG. 5 is an orthographic surface view of the particular releasable fastener used with my invention.

Tightening structure 12, as illustrated particularly in FIGS. 4 and 5, is seen to include fastening chain 31 communicating between the medial parts of opposed cooperating side chains 19 on the outside of the device. Hames type tightening device 32 is provided in fastening chain 31 preferably, though not necessarily, in a medial position. The Hames tightening device is well known per se in the prior art, especially for tightening chains and harness elements, and is seen in detail in FIG.

5 to comprise body 33 fastened to an associate chain by connecting link 34 and pivoting at the other end bell-crank fastening lever 35 which pivotably connects fastening hook 36 at one end all as illustrated. As fastening lever 35 is manually pivoted toward fastening hook 36, the device tightens and as the handle is pivoted in the opposite direction it loosens all to create a releasable lost motion fastening structure as illustrated.

My traction device is constructed from reasonably rigid, durable material, preferably such as mild steel. It well may be formed from other materials of sufficient rigidity and durability, but they may not serve the purposes of the device so well, especially as to wearability. Plastic materials may be used, but I have found them not particularly desirable.

The device may be variously sized to fit particular tire structures and preferably a chain is formed for each size category of tires. Obviously the various chain linkages of my device might be made adjustable by appropriate interconnecting links so that one particular chain structure might be used to fit several different sizes of tire, but generally this practice is not desirable because it may cause an excess of chain in the structure at various points and this tends to cause added and unnecessary dynamic instability and additional noise and wear during operation.

Having thusly described my invention, its operation may be readily understood.

Firstly a chain is formed according to the foregoing specification and of a size and configuration to fit substantially as described upon the particular tire to be serviced.

The chain is opened by releasing tightening device 32, releasing rigid connecting bar 21 from its joinder with inner lower rigid arcuate element 18, and releasing one end of outer bottom interconnecting chain 19 from the interconnected rigid arcuate elements 18, if releasable. In this condition the device is positioned on the wheel to be serviced by draping the chain over the top of the wheel with one gap 37 substantially vertically above hub 17 of the wheel mounting tire 13. Inner rigid connecting bar 21 is then reconnected to the adjacent end part of inner arcuate element 18 carrying headed pin 27. The end of outer lower interconnecting chain 19 is reconnected to the end of adjacent rigid arcuate element 18 and tightening device 32 is tightened to affix the chain in position ready for operation on the serviced wheel. The traction device will then operate in the traditional fashion of the ordinary continuous tire chain heretofore well known in the art. Gaps 37 about the periphery of the wheel create little loss of efficiency in either traction or anti-skid features because of wheel motion and particularly the speed of that motion. To remove the chain the procedure is reversed.

From the foregoing description it should be noted that a chain formed as specified will allow some manner of adjustment which is sufficient to allow it to fit over tires of varying width and the same diameter. Oftentimes it may allow the chain to be used on tires of different diameter if the difference in diameter is not too great.

It should further be noted that the rigid arcuate elements 18 that form a part of the sides of my chain tend to maintain the chain in position on a moving and deforming tire much more effectively than side elements formed completely of chain, cable or other flexible materials and require less tension to do this than such other structures.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A traction device for resilient pneumatic tires that may be installed about the periphery of such tire without moving the tire relative to its supporting surface, comprising, in combination:

elongate, paired opposed side elements each having two similar rigid arcuate elements configured to provide a substantially radially symetrically fit on a tire to be serviced, and two connecting elements, articulatingly interconnecting the rigid arcuate elements,
  the two outside connecting elements comprising shorter interconnecting chains and
  the two inside connecting elements comprising one shorter interconnecting chain and one compound adjustable rigid connecting bar linkage;
plural spaced chain cross-links extendable across a tire tread and communicating between the opposed cooperating rigid arcuate elements of each side element to form an interconnected structure;
articulating means interrconnecting the respective ends of each side element and the end of the associated connecting element, at least one of which means carried by the inside side element is releasably fastenable; and
tightening means extending between the medial diametrically opposed portions of the outside chain connecting elements to releasably tighten the traction device about the periphery of a tire carrying it.

* * * * *